Figure 1:
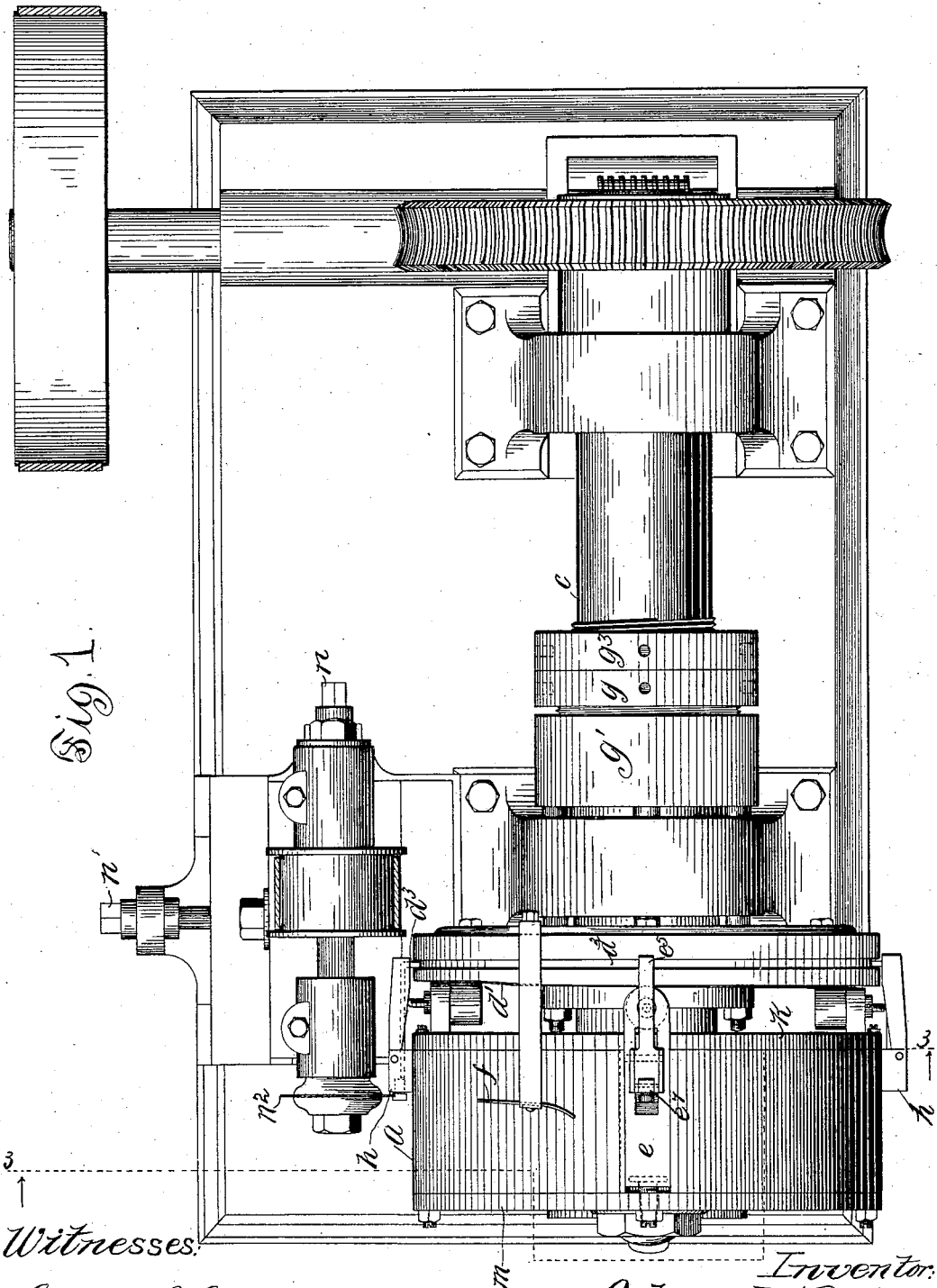

(No Model.) 4 Sheets—Sheet 1.
O. P. BRIGGS.
MONITOR MILLING MACHINE.
No. 563,256. Patented July 7, 1896.

(No Model.) 4 Sheets—Sheet 3.

O. P. BRIGGS.
MONITOR MILLING MACHINE.

No. 563,256. Patented July 7, 1896.

Witnesses:
George L. Cragg.
Harriet G. Pempleton.

Inventor:
Orlando P. Briggs.
By Barton & Brown
Attorneys.

(No Model.) 4 Sheets—Sheet 4.

O. P. BRIGGS.
MONITOR MILLING MACHINE.

No. 563,256. Patented July 7, 1896.

Witnesses:
George L. Cragg
Harriet G. Pendleton

Inventor:
Orlando P. Briggs
By Barton & Brown
Attorneys.

THE NORRIS PETERS CO., PHOTO-LITHO., WASHINGTON, D. C.

UNITED STATES PATENT OFFICE.

ORLANDO P. BRIGGS, OF CHICAGO, ILLINOIS, ASSIGNOR TO THE WESTERN ELECTRIC COMPANY, OF SAME PLACE.

MONITOR MILLING-MACHINE.

SPECIFICATION forming part of Letters Patent No. 563,256, dated July 7, 1896.

Application filed August 2, 1894. Serial No. 519,263. (No model.)

*To all whom it may concern:*

Be it known that I, ORLANDO P. BRIGGS, a citizen of the United States, residing at Chicago, in the county of Cook and State of Illinois, have invented a certain new and useful Improvement in Monitor Milling-Machines, (Case No. 14,) of which the following is a full, clear, concise, and exact description, reference being had to the accompanying drawings, forming a part of this specification.

My invention relates to machines for slotting various kinds of metal work, as screws, studs, and shells or small cylinders.

The construction of my machine is such that the work may be placed in the chucks, several being provided on a revolving head, and automatically clamped in proper position and carried against the tool for making the slot, and then automatically discharged. The only operation that is done manually consists in simply picking up the pieces of work, one at a time, and inserting the same in the chucks.

A boy with my machine will ordinarily put through twenty-five thousand pieces of work in a day of nine and one-half hours, and the character of the work performed is better than heretofore. Heretofore hand-machines have been employed, the work placed in the chucks being moved up to the saw by hand, or else the saw has been passed over the work. In the old way a boy has been able to slot, say, four or five thousand pieces of work in a day.

In one form of my machine I provide plungers consisting of rods or needles for thrusting the work out of the chuck. When the work is of such form that it may be held in a vertical chuck, the plungers are not necessary, since the pieces of work, as screws, will fall out by gravity. In the case of shells which are to be slotted on the sides the chucks are arranged horizontally, and hence in such cases a plunger is required for each chuck.

Broadly speaking, my invention comprises a machine provided with revolving chucks, into which chucks the pieces of work are inserted, one at a time, by hand, and then clamped automatically by the chuck and carried against the saw or tool which cuts the work as required, after which the pieces are released and discharged.

My machine has been used in the manufacture of the tubes or shells of spring-jack switches, which tubes have been slotted sometimes on the ends and sometimes on the sides to provide ready means of attaching the other parts.

I have also used my machine for cutting the slots in machine-screws, and in the latter case the chucks have been placed at equal distances apart about the periphery of the revolving head, and the jaws arranged so that the screws would point centrally toward the shaft upon which this head is located. As thus arranged, the screws, after being slotted, will fall out by their own weight when the jaws are opened. The chucks that are adapted to hold the shells are likewise placed about the periphery of the head at equal distances apart, but the clamping-jaws are placed parallel with the axis of the head, and, in this case, some special device must be employed in discharging the shells after the jaws have opened. The same machine, however, may be employed for doing various kinds of work, the only modifications being in the construction and position of the chucks.

My invention will be more readily understood by reference to the accompanying drawings, in which—

Figure 2:
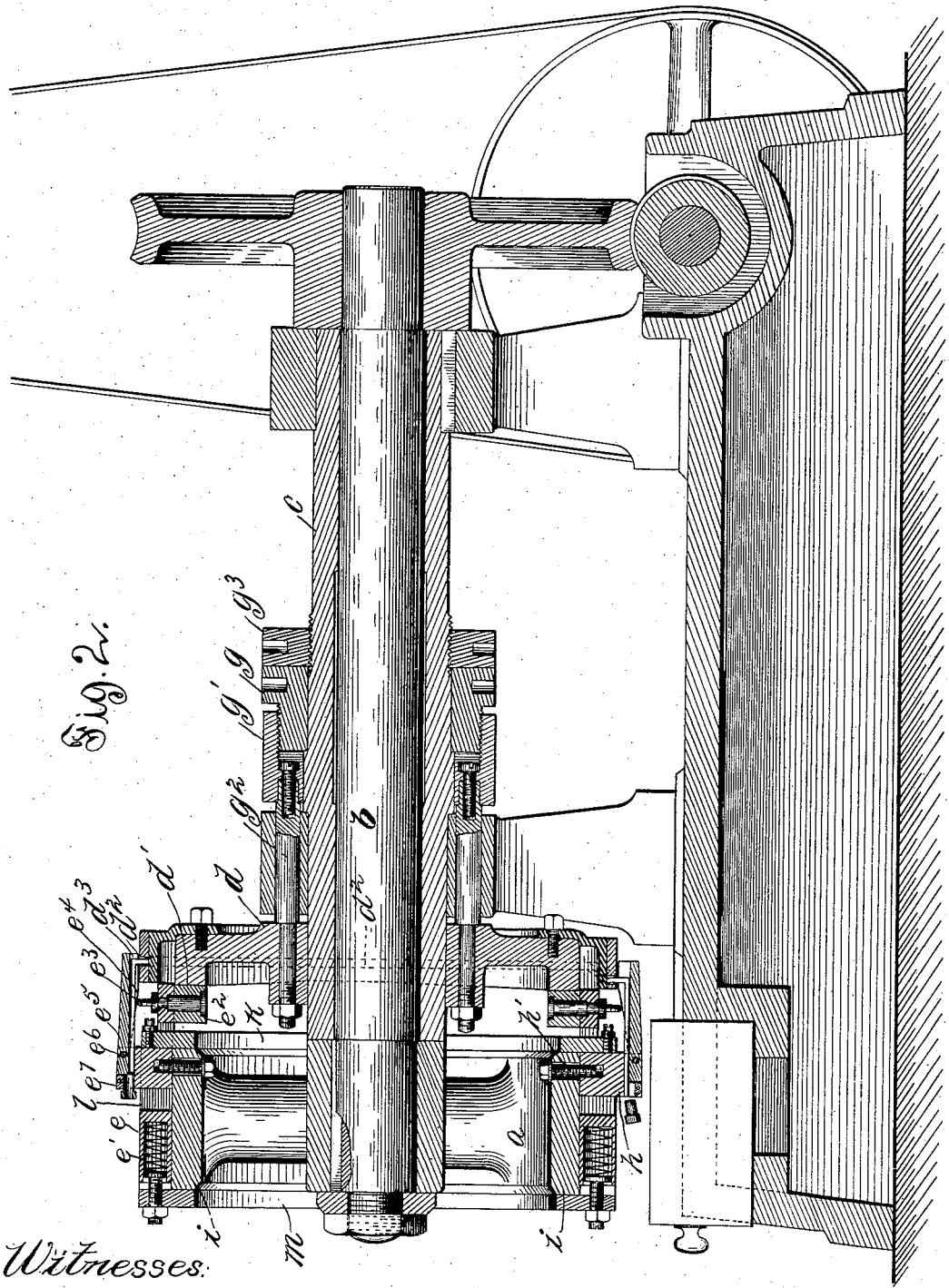
Figure 3:
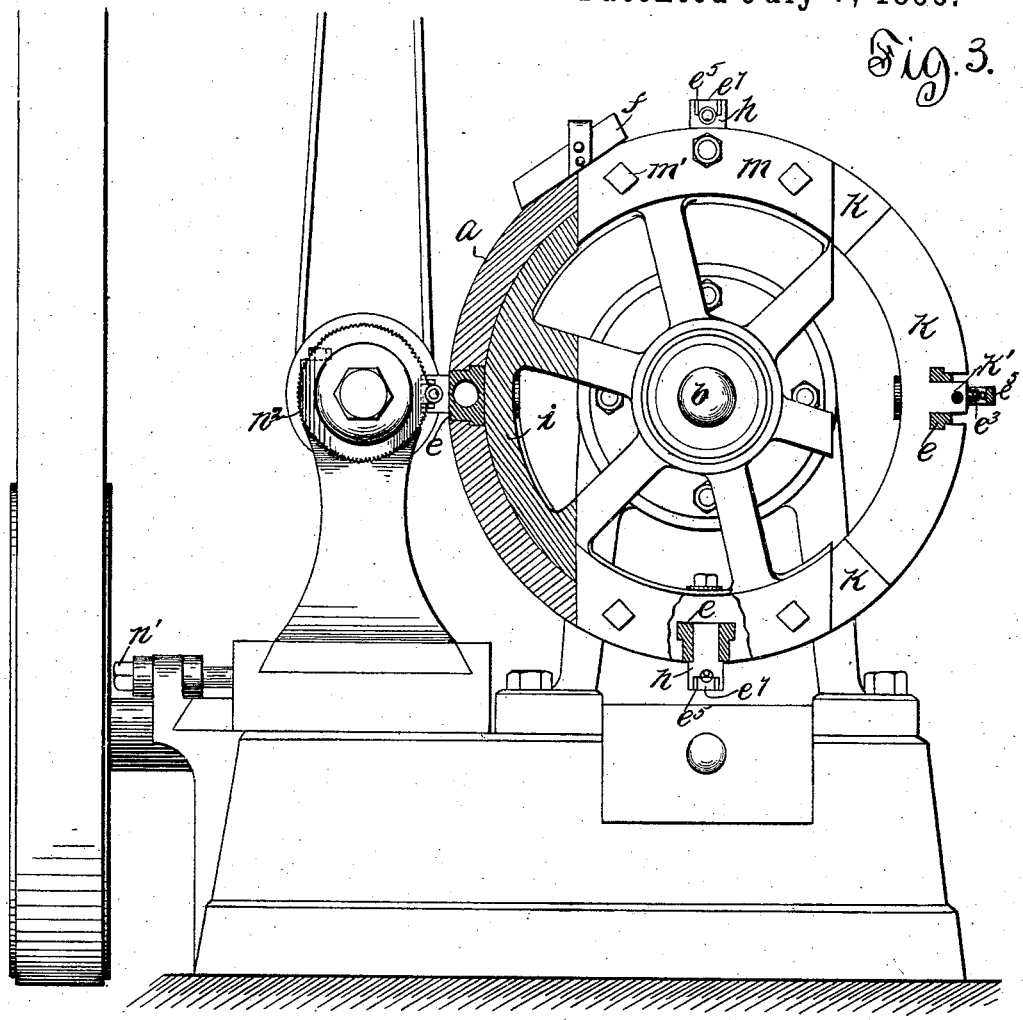
Figure 4:
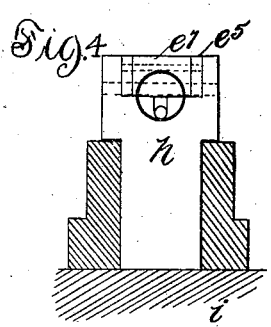
Figure 5:
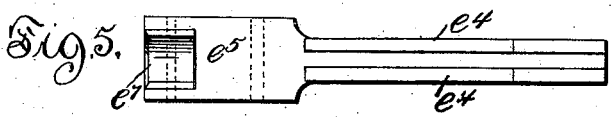
Figure 6:
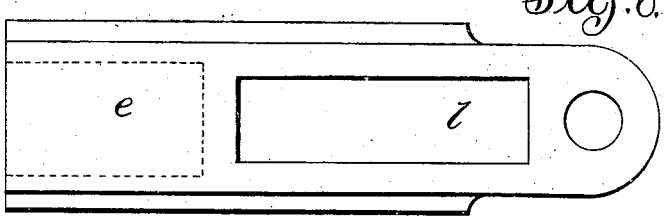
Figure 7:
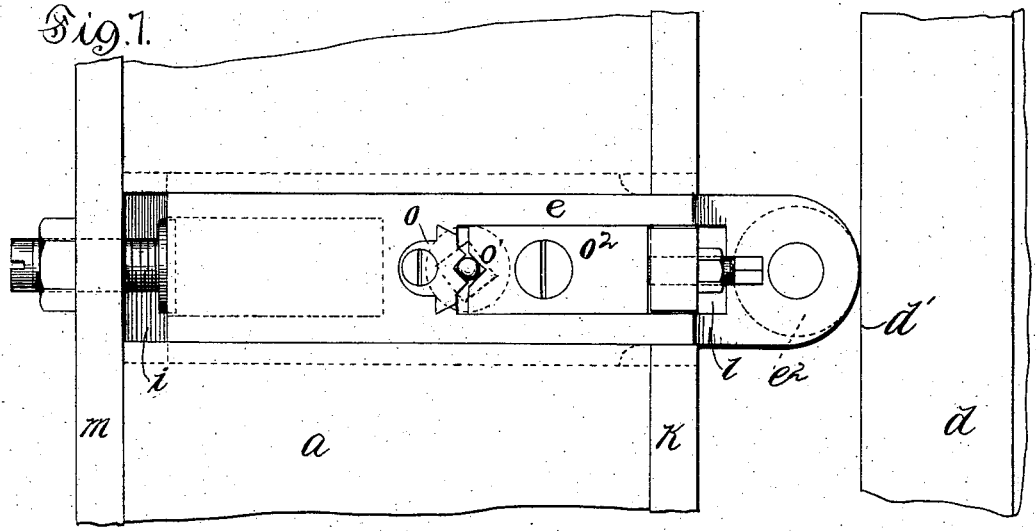
Figure 8:
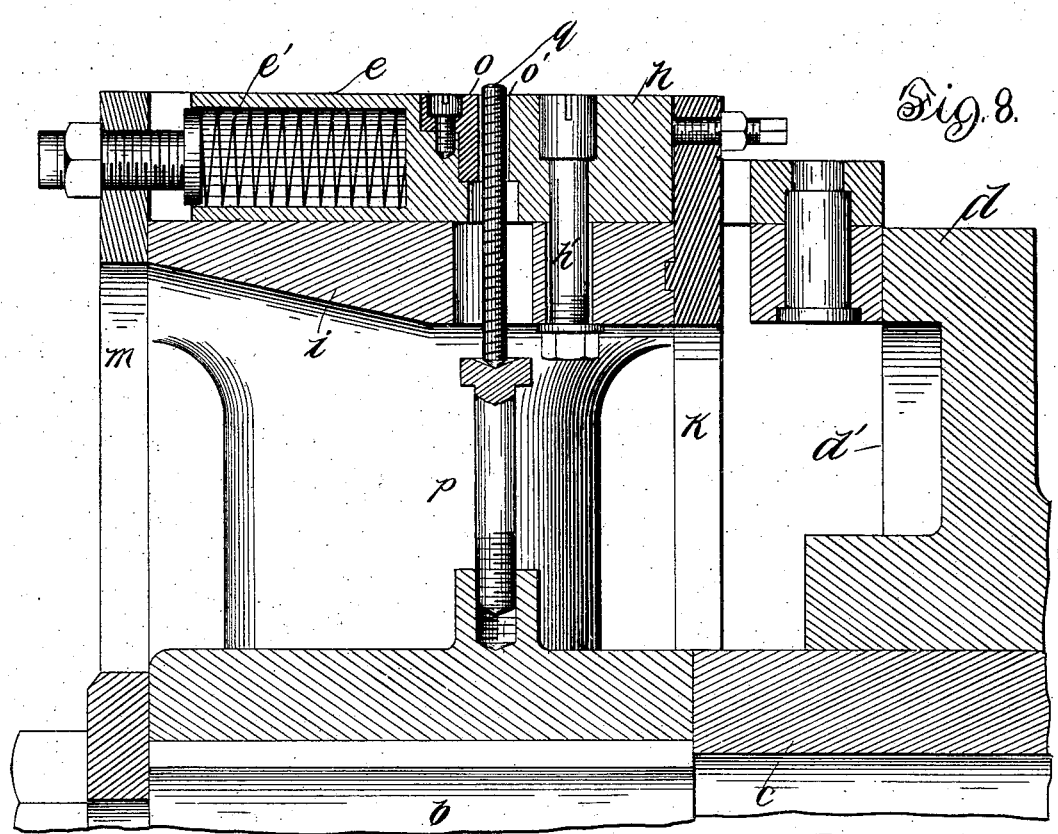

Figure 1 is a plan view of my machine, together with the saw which constitutes the cutting-tool, a piece of work being shown in contact with the saw, the chucks being adapted to carrying and discharging shells that are to be slotted on the side. Fig. 2 is a vertical longitudinal central section thereof, one shell being shown as just inserted and before the jaws of the clamp have closed thereon and another shell being shown just as it has been discharged from its chuck. Fig. 3 is an end view as seen from the irregular sectional line 3 3 of Fig. 1. Fig. 4 is a view somewhat in detail of the chucking device. Fig. 5 is a view from below of the pivoted lever of a chuck. Fig. 6 is a plan of the slide which is acted upon by a spring and cam to close and open the chuck. Fig. 7 is a plan view showing the revolving head provided with chucks adapted to receive work that is to be slotted upon the end. Fig. 8 is a longitudinal sectional view thereof.

Like parts are indicated by similar letters of reference throughout the different figures.

The revolving head $a$ is mounted on the driving-shaft $b$, which is journaled in the sleeve $c$, upon which sleeve the actuating-cams are mounted. That is to say, the longitudinally-adjustable cam-disk $d$ is provided with the cam-surface $d'$, which is adapted to control the opening and closing of the chucks, and with the cam-groove $d^2$, in which the hooked ends $d^3$ of the plungers are placed, and as they come one after another to the diagonal portion of the groove, are moved forward, so that the ends of the plungers are thrust against the shells to discharge the same. That is to say, each plunger actuated by the diagonal portion of the cam-groove $d^2$ is caused to push out the finished piece of work that has been placed in its chuck. The groove $d^2$ is of such form that each plunger after acting to remove a piece of work is brought back to its normal position, so that new work may be inserted in the chuck.

I will now describe the chucking device somewhat in detail.

The slide $e$, forming a portion thereof, and in which the adjustable spring $e'$ is located, is provided with a roller $e^2$, which is pressed by the spring against the cam-surface $d'$ until said roller passes to the receding portion of the cam, whereupon the slide $e$, actuated by the spring, is moved to bring the clamping-stud $e^3$ against the inclined under surface $e^4$ of the clamping-jaw lever $e^5$. The clamping-jaw lever $e^5$ is thus raised by its contact with the stud $e^3$, and thus rotated upon its pivot $e^6$, and the work being in place, as shown, the pivoted jaw $e^7$ is brought firmly against the work—in this instance a shell—to hold the same in the position shown in Fig. 2. The construction of the jaw $e^7$ will be more readily understood by reference to Fig. 5. This jaw being pivoted its under surface will conform to the shell and bear evenly and uniformly thereon.

As shown in Fig. 2, the end of the plunger having the hook $d^3$ extends nearly to the end of the shell which has been placed in the chuck. In order that each piece of work may be slotted uniformly, a pressure-spring $f$ is provided, against which each shell is passed while in the act of being clamped, thus insuring uniformity of projection as to each shell.

Different heads, provided with any desired form of chucking device, may be used upon the same working shaft $b$. In order that the cam $d$ may be adjusted with respect to different clamping devices of the different heads, I have provided upon the sleeve $c$ mechanism for adjusting the said cam laterally thereon and securing the same in any desired position. The mechanism which I have shown consists of an adjusting-nut $g$, engaging with the carrying-collar $g'$, in which carrying-collar are secured studs extending through the upper portion of the pedestal upon which sleeve $c$ is mounted. To the opposite ends of these studs is secured the cam $d$, as shown. Thus, simply by turning the adjusting-nut $g$ the cam $d$ may be moved longitudinally upon the sleeve $c$, as desired, and, by means of the jam-nut $g^3$, firmly held in position after being so adjusted.

I have employed a special construction whereby the blocks which form the lower jaws, and which serve as pivotal supports for the levers of the upper jaws, may be adjusted longitudinally upon the head. Each block $h$, after being adjusted in position, is held in place by a screw $h'$, which passes through a slot in the outer rim $i$ of the head. To this rim is secured a ring made up of sections $k$ $k$, as shown most clearly in Fig. 3. Each section $k$ is provided with a tongue $k'$, which passes through a slot $l$, provided in its corresponding slide $e$. A set-screw passing through each tongue bears against the corresponding block. By turning the set-screws the blocks may be adjusted longitudinally, as desired, and then secured in position by tightening the clamping-screws $h'$. The front ring $m$ may be continuous, and its construction is such that by removing the screws $m'$ the ring $m$ may be taken off to obtain access to the slides $e$ and springs $e'$.

By means of adjusting-screws $n$ $n'$ the saw $n^2$ may be adjusted in either direction.

The head (shown in Figs. 7 and 8) is provided with chucking devices adapted to hold work that is to be slotted upon one of the ends thereof. The cam $d$ acts upon the slide $e$ in the manner heretofore described. The chucking-jaws are, however, modified as required by the particular class of work that is to be performed. The clamping-surfaces $o$ $o'$ are provided, as shown, in sliding block $e$ and in the block $o^2$, respectively. The block $o^2$ is adjustably secured to the shell of the head. It is evident that, when the jaws are thus disposed, the work, when carried to the under side of the head, after being slotted by the saw, will fall out as the jaws open.

It is evident that the work to be operated upon at a particular time and with a particular head and adjustment of a head must be uniform—that is, if shells, the shells should be of the same size and shape, and the same may be said as to screws, studs, or other varieties of work to be operated upon. It is necessary, therefore, that the bottom of the chuck, when the bottom serves as the stop for the work when inserted, must be so adjusted that each variety of work may be inserted the proper distance. Provision is made for such adjustment, as shown in Fig. 2, since the block $h$, forming one of the jaws and serving as a pivotal support for the other, may be adjusted by means of a set-screw and held in place by a clamping-screw, as before described. That is, all the chucks upon the head may be adjusted so that they will be of the right depth, their bottoms forming the stops being in the same plane.

In Figs. 7 and 8 I have likewise shown ready means of adjusting the depth to which the work is inserted in the chucks. This means of adjustment consists of an adjustable bottom $p$ for the chuck, in this instance consisting of a screw having a concave head which forms a stop for the work $q$ when inserted, as shown. Any other suitable means may be employed whereby the depth of the opening in the chuck, that is, the position of the bottom or whatever forms the stop, may be adjusted to suit different varieties of work.

It is evident that machines embodying my invention herein may be varied as to details of construction without departing from my invention.

Having thus described my invention, I claim as new and desire to secure by Letters Patent—

1. The combination with a stationary cam-disk having a cam-surface upon its face, of a rotating head carrying around the periphery thereof clamps for holding the stock being operated upon, said rotating head being parallel to the cam-disk, and means for adjustably moving the cam-disk toward and from the head; substantially as and for the purpose set forth.

2. The combination with a cam-disk carrying a cam surface or guide upon its face and a cam-guide upon its periphery, of a rotating head, clamps for the stock provided thereon and operated by means of the cam-surface upon the face of said cam-disk, and an ejector operated by the cam-guide upon the periphery of said cam-disk, substantially as described.

3. The combination with the stationary bearing or sleeve $c$ carrying the cam-disk $d$, of the shaft $b$, the rotating head mounted upon said shaft situated opposite said cam-disk, clamps carried upon said head and operated by means of said cam-disk, said cam-disk $d$ being mounted upon said sleeve $c$ so that the same may be adjusted longitudinally thereon; substantially as described.

4. The combination with a cam-disk mounted stationarily and provided upon the face with a cam-surface, of a rotating head mounted in front of said cam-disk, a series of plungers provided at intervals around the periphery of said rotating head and arranged to move to and fro parallel to the axis of rotation of the head, and a cam-roller mounted to move with said plunger and engaging the cam-surface upon said cam-disk, whereby the several plungers are moved to and fro as the head rotates; substantially as and for the purpose set forth.

In witness whereof I hereunto subscribe my name this 30th day of July, A. D. 1894.

ORLANDO P. BRIGGS.

Witnesses:
GEORGE L. CRAGG,
HARRIET G. TEMPLETON.